(12) United States Patent
Gebauer et al.

(10) Patent No.: US 9,998,244 B2
(45) Date of Patent: *Jun. 12, 2018

(54) METHOD AND APPARATUS FOR MIXING EVENT DRIVEN MEDIA

(71) Applicant: FOX FILMED ENTERTAINMENT, Los Angeles, CA (US)

(72) Inventors: Marc Dana Gebauer, Lawndale, CA (US); Jerry Jeffrey Minnich, Valencia, CA (US); Derek Anthony Casari, Sherman Oaks, CA (US); Ronald Lewis Evans, Sherman Oaks, CA (US); Timothy Edward Lauber, Sylmar, CA (US)

(73) Assignee: FOX FILMED ENTERTAINMENT, Los Angeles, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/810,185

(22) Filed: Jul. 27, 2015

(65) Prior Publication Data

US 2015/0333855 A1  Nov. 19, 2015

Related U.S. Application Data

(63) Continuation of application No. 13/557,194, filed on Jul. 24, 2012, now Pat. No. 9,094,742.

(51) Int. Cl.
| | |
|---|---|
| *G10H 1/00* | (2006.01) |
| *H04H 60/04* | (2008.01) |
| *H04R 3/00* | (2006.01) |
| *G11B 27/028* | (2006.01) |
| *G06F 3/16* | (2006.01) |
| *H04R 27/00* | (2006.01) |

(52) U.S. Cl.
CPC ............. *H04H 60/04* (2013.01); *G06F 3/165* (2013.01); *G11B 27/028* (2013.01); *H04R 3/00* (2013.01); *H04R 3/005* (2013.01); *H04R 27/00* (2013.01)

(58) Field of Classification Search
CPC ..... H04R 3/005; H04R 2420/01; H04H 60/04
USPC .............................................. 381/118, 119, 2
See application file for complete search history.

(56) References Cited

U.S. PATENT DOCUMENTS

| | | | |
|---|---|---|---|
| 3,697,692 A | 10/1972 | Hafler | |
| 5,402,501 A * | 3/1995 | Silfvajt | ................. H04H 60/04 |
| | | | 381/119 |
| 5,633,938 A * | 5/1997 | Porter, III | ................ H03G 5/22 |
| | | | 381/1 |
| 2002/0085642 A1* | 7/2002 | Kunikata | ............. G10H 1/0058 |
| | | | 375/260 |
| 2006/0064187 A1 | 3/2006 | Nishikori et al. | |
| 2009/0178541 A1 | 7/2009 | Fukushima et al. | |
| 2010/0303260 A1 | 12/2010 | Stieler von Heydekampf et al. | |

(Continued)

OTHER PUBLICATIONS

Martinsound, "Audio Horizons/New Ideas in Recording from Martinsound", Fall 1997.

(Continued)

*Primary Examiner* — Alexander Jamal
(74) *Attorney, Agent, or Firm* — Gates & Cooper LLP (57) ABSTRACT

An event-drivable and programmable matrix that permits reconfigurable mixing of a first plurality of audio sources into a second audio outputs via digital control of analog-only signal paths is disclosed.

35 Claims, 6 Drawing Sheets

(56) References Cited

U.S. PATENT DOCUMENTS

2012/0195445 A1* 8/2012 Inlow .................... H04H 60/04
381/119

OTHER PUBLICATIONS

TOA Corporation, "Digital Mixer D-901 Instruction Manual—Version 3", Dec. 2004.
"Ambience (Sound Recording)", Wikipedia, the free encyclopedia, last edited Oct. 29, 2017. https://en.wikipedia.org/wiki/Ambience_(sound_recording).

* cited by examiner

METHOD AND APPARATUS FOR MIXING EVENT DRIVEN MEDIA

CROSS-REFERENCE TO RELATED APPLICATIONS

This application is a continuation of U.S. patent application Ser. No. 13/557,194, entitled "EVENT DRIVABLE N×M PROGRAMMABLY INTERCONNECTING SOUND MIXING DEVICE AND METHOD FOR USE THEREOF," by Marc D. Gebauer, Jerry J. Minnich, Derek A. Casari, Ronald L. Evans, and Timothy E. Lauber, filed Jul. 24, 2012, now U.S. Pat. No. 9,094,742, issued Jul. 28, 2015, which application is hereby incorporated by reference herein.

BACKGROUND OF THE INVENTION

1. Field of the Invention

The present invention relates generally to systems and methods for mixing audio signals and more specifically to an event-drivable matrix that permits reconfigurable mixing N audio sources into M audio outputs via programming.

2. Description of the Related Art

It is known that audio recordings, including movie soundtracks are recorded on a plurality of channels and mixed together post production to produce the final sound track. It is also known to perform "dubbing" . . . a process by which voices of actors or other audio information may be replaced in the soundtrack subsequent to the original shooting. This may involve a substitution of voices of the actors shown in the video portion of the media program by different performers speaking a different language, or the same performers in the same language, but with altered dialog or replace substandard production recorded dialog. This is known as automated dialog replacement or additional dialogue recording (ADR). Music may also be dubbed into the media program after editing is completed.

In typical film production, a production sound mixer records dialogue during filming. Undesirable noise from the recording process (from equipment, traffic, wind, and the overall ambiance of the surrounding environment) can cause undesirable sound for the end product. These problems can be solved with a post production process in which a supervising sound editor or ADR supervisor reviews all of the dialogue in the film and decides which lines will have to be re-recorded. ADR is also used to change the original lines recorded on set in order to clarify context, or to improve the actor's diction and timing.

For animation such as computer-generated imagery or animated cartoons, dialogue can be recorded in advance or to a pre-edited version of the show. Although the characters' voices are recorded in a studio, ADR may still be necessary if members of the cast cannot all be present at once, or if dialog changes are necessary.

ADR is recorded during an ADR session, which takes place in an ADR sound studio. The actor, usually the original actor from the set, may be shown the scene in question along with the original sound, following which he or she attempts to recreate the performance as closely as possible. Over the course of multiple re-takes the actor may repeatedly perform the lines while watching or listening to the scene, and the most suitable take will make it to the final version of the scene.

This process is time consuming and involves a lot of activity that can overload the person operating as the ADR mixer. And if the ADR mixer requires excessive time to set up, queue, and record the retakes, the performers can lose the flow of the dialog and/or become irritated with the post production process. Also, all of the individuals and equipment involved in the ADR process can be expensive, particularly the actors and producers. What is needed is a system that reduces the load on the ADR mixer and allows the ADR process to be completed rapidly, yet providing each of the players (the ADR mixer, the performer(s), the sound editor(s) and the producer(s) the information they desire.

Typical ADR systems of today are also limited in what they can accomplish. For example, an ADR system may provide a particular actor with portions or all of the sound track that is temporally before the point where the new dialog is to be included (ahead), where the dialog is to be included (in) or after where the new dialog is to be included (past). If the ahead portion of the sound track includes street noise and ambience, and the new portion of the sound track does not, the result would be that the performer would hear their own voice during the "in" portion of the sound track, but with such substantially different ambience or background noise so as to startle the performer. While it may be possible to solve this problem by eliminating ambience and street noise from all portions of the sound track (ahead, in and past), this would deny the performer with ambience information that may contribute to the performance. What is needed is a system that permits special effects such as ambience to be included into sound outputs that are provided to the actors and other participants for queuing purposes.

It is also desirable for the ADR mixer to be able to communicate the output of the ADR/mixing process to remotely located persons at or near real time, thus allowing someone at a remote location to judge the quality of the ADR process or mix.

The present invention satisfies these needs.

SUMMARY OF THE INVENTION

To address the requirements described above, the present invention discloses a sound mixing apparatus and method for using same. In one embodiment, the apparatus comprises an event-driven matrix programmably interconnecting a first plurality of audio sources to a second plurality of audio outputs according to events. The matrix comprises a control module, for accepting user input comprising event controls, signal routing commands, and signal level commands and for generating control module commands according to the event controls and analog signal routing commands, a plurality of audio modules, each of the plurality of audio modules communicatively coupled to an associated one or more of the plurality of audio sources, to the control module, and to an event generator providing the events, wherein each of the plurality of audio modules comprises at least one audio module amplifier, non-digitally coupled to the associated one or more of the plurality of audio sources and digitally controlled to provide an analog amplifier output according to the event controls, the signal routing commands, the signal level commands, and the events. The matrix also comprises a master module, for combining each of the analog outputs according to the event controls, the signal routing commands, and the events, the master module communicatively coupled to the control module and to the event generator providing the events, the master module comprising at least one master module amplifier, non-digitally coupled to the analog outputs via an associated one of a plurality of summers and digitally controlled to provide the second plurality of analog outputs according to the event controls, the signal routing commands, the signal level commands, and the events.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
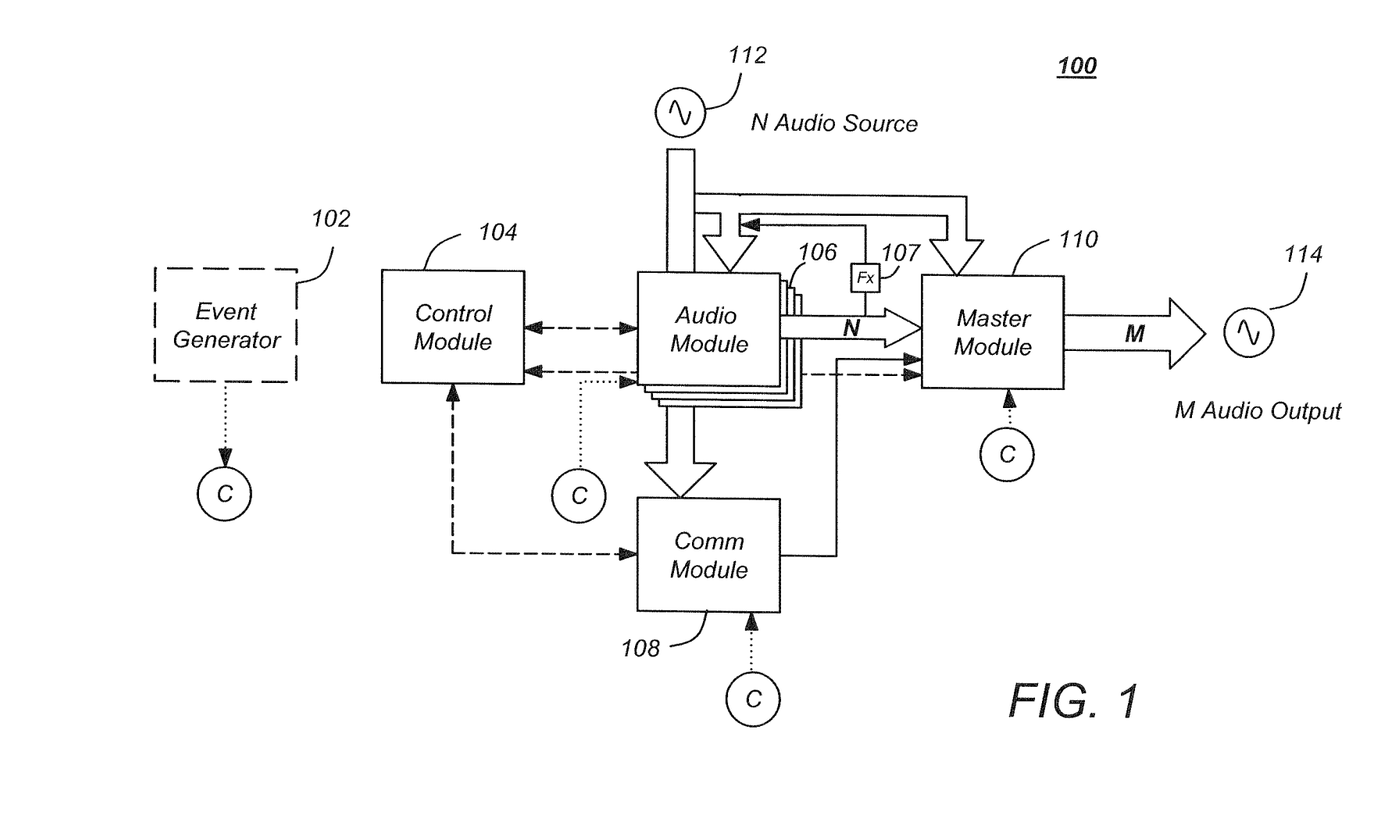
FIG. 1 is a block diagram of on embodiment of the sound mixing device.

FIG. 1 is a block diagram of on embodiment of the sound-mixing device (SMD) 100. The SMD 100 comprises a control module 104 that provides control module commands to one or more audio modules 106, a master module 110 and a communication module 108 via the communications paths indicated with dashed lines. The control module 104 also includes user input controls further described below.

Event generator 102 provides events that are fed to modules 106, 108 and 110 via dotted lines. Although events may be transmitted to any of the modules 104-110 (for example, the control module 104) and thereafter to the remaining modules, sending the events to each of the modules via independent paths assures that continuous operation of the SMD 100 even with the failure of one of the other modules 104-110.

The SMD 100 also includes one or more audio modules 106. The one or more audio modules 106 are coupled to one or more of a plurality of audio sources 112, each of which can have a plurality of channels (e.g. two stereo channels or five surround sound channels).

In the illustrated embodiment, the audio modules include (1) a DIRECT audio module that carries the signal from a performer's microphone, (2) a MONITOR audio module that carries the playback of the completed soundtrack after the ADR process, (3) a DIALOG audio module that carries the dialog already recorded on the soundtrack before ADR, but not the music or effects, (4) a MUSIC audio module that carries the music already recorded on the soundtrack before ADR but not the effects or dialog, (5) an EFFECTS audio module that carries sound effects already recorded on the soundtrack before ADR, but not the dialog or music. The level of each of these inputs can be controlled by user controls 310. The plurality of audio modules may also include a plurality of separate return audio modules and a cueing beep audio module that carries beeps that cue the performers. Each of these audio modules may comprise multiple channels (e.g. the two stereo channels or six 5.1 surround sound channels), as required for the audio information conveyed. Hence, each may include dedicated electronics for each channel.

The audio sources 112 may include one or more microphones, pre-recorded material, beeps from the event generator 102, and/or one or more analog or digital audio reproducing devices or analogous. The output from the audio modules 106 or channels may also be routed to be provided as an input to another audio module 106. For example, the output of the dialog audio module 106 may be provided to an effects processor 107, which generates ambience duplicating the ambience on the recorded sound track, and that ambience may be routed as an input as an audio source into the "return" audio module. This may be implemented by external routing or patching, if necessary.

The audio module(s) 106 accept signals from the plurality audio source(s), selectably apply those the signals 112 to amplifiers within the audio modules according to commands from the control module 104, the user routing controls described below, and events from the event generator 102, gain controls (amplifies or attenuates) the signals according to the gain selected by the user, and provides the selected and gain controlled signals to each of the master module 110 for appropriate mixing.

Communications module 108 is also coupled to one or more of the plurality of audio sources 112 and also provides one or more of the signals from the audio sources to the master module, according to user inputs.

Each of the master modules 110 combine the outputs of each of the audio modules 106 and the communication module 108 as directed by the control module 104, as further described below.

Figure 2:
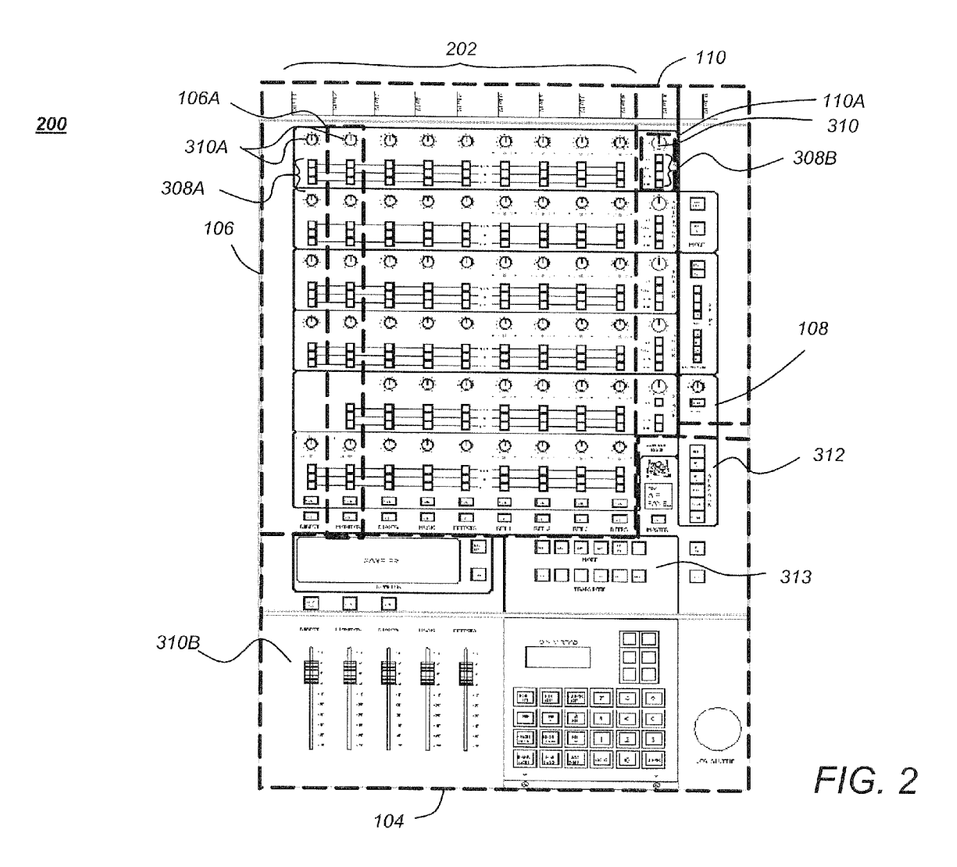
FIG. 2 is a diagram of an exemplary user interface for the SMD.

FIG. 2 is a diagram of an exemplary user interface for the SMD 100. The user interface 200 illustrates some controls used to operate the SMD 100, including controls related to the control module 104, the plurality of audio modules 106 (each vertical line of controls reflects one audio module such as audio module 106A), the master module 110, and communication module 108. Reference to these controls will be made further below with respect to FIG. 3.

Figure 3:
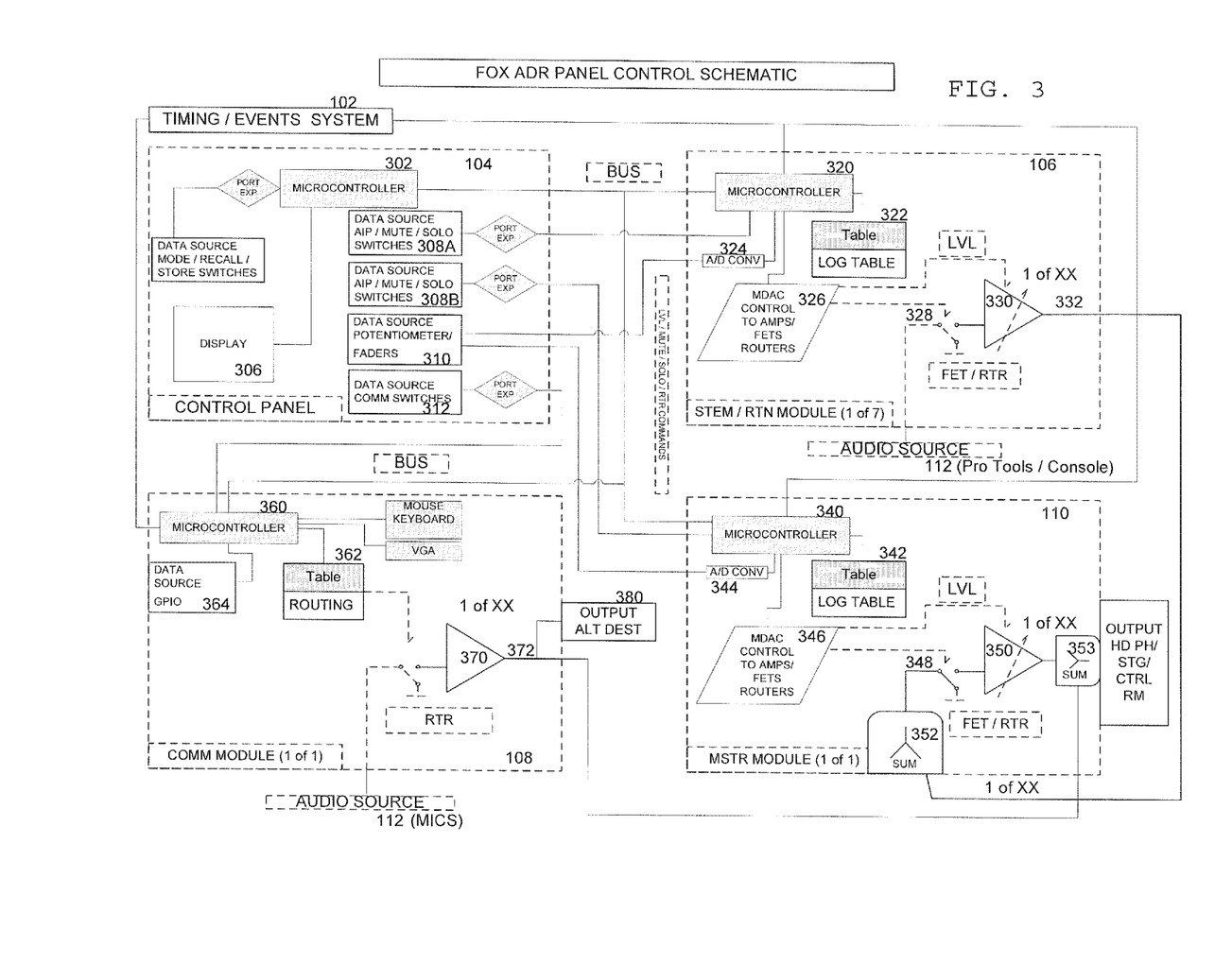
FIG. 3 is a functional block diagram of one embodiment of the SMD.

FIG. 3 is a functional block diagram of one embodiment of the SMD 100. The SMD 100 receives event information from the event generator 102. These events are places temporally disposed within the sound track recording where it is desired to alter or place new dialog or other information into the sound track. The events can be defined by time, by frame, or combination of time and frames. For example, if 20:42 and 5 frames after the beginning of a sound track, it is desired to change the dialog from "to be or not to be" to "doobie-doobie-doo," the event generator 102 may provide an event at the indicated time. Multiple events corresponding to other places where dialog may be changed, added or subtracted may also be provided to the SMD 100. In the illustrated embodiment, events are provided from the event generator 102 to each of the control module 104, one or more audio modules 106, one or more master modules 110 and the communication module, via each module's respective micro controller 302, 320, 340 and 360. This permits the SMD 100 to operate even if one of the modules 104-110 becomes inoperative. Alternatively or in addition to this topology, the events may be provided to one of the modules 104-110 and thereafter provided to the others via one or more of the busses illustrated in FIG. 3.

The control module 104 has a plurality of data source switches or user event controls 308A and 308B and faders 310B, which may be potentiometers, as well as data source communication switches 312. The control module microcontroller 302 generates control module commands according to the state of user controls 308A, 308B, 310, 312, and 313 and provides them to the bus. The control module commands are generated in accordance with microcontroller programming that can be implemented in a memory resident in the microcontroller 302 or elsewhere in the SMD 100. In one embodiment, this programming includes settings stored in memory accessible to the microcontroller 302, specifying the interconnections and positions of the switches described below, thus controlling which audio sources 112 and/or outputs 114 are combined with which other audio sources 112 or outputs 114 to provide the soundtrack. The programming can also specify the mapping relationship between potentiometer switch settings and commands to analog components.

The control module 102 commands are provided from the control module 104 to audio module(s) 106, the master module(s) 110, and the communication module 108. These control module commands command those modules to interconnect indicated audio sources 112 to the desired amplifiers within the other of the modules as described further below.

The control module 104 also includes an optional display 306, which may indicate the gain (for example in dB) of any audio channel in the system via the setting of any of the potentiometers or faders. For example, in one embodiment, when the user adjusts the gain of any fader or potentiometer in either the audio module 112, the master module 110, or the control module 104, the microcontroller associated with that module transmits information back to the control microcontroller 302 indicating the setting of the fader, and that information is presented on the display 306. The display may also comprise an light emitting diode (LED) or cathode ray tube (CRT) display that presents a graphical representation of which audio sources 112 are coupled together to form each of the communications module 108 routing outputs using current communication microcontroller 360 programming and table 362 settings, as well as the settings of and related tables of other microcontrollers 320, 340 and 360 in the system. This can be accomplished because the control module 104 has access to the resources of the communication module 108, and can therefore obtain the required information and receiving user input from other devices such as a mouse and keyboard shown in the communication module 108.

The audio modules 106 each include a audio module microcontroller 320 that is communicatively coupled to the control microcontroller 104 via a bus such as an I2C bus to receive control module commands responsive to user input provided by input devices 308-313 and to receive events from the event generator 102. The audio module microcontroller 320 is also communicatively coupled to user event controls such as data source switches 308A. In the illustrated embodiment, these switches 308A are coupled to the audio module microcontroller 320 directly through the bus and not via the control module microcontroller 302. This design improves the responsiveness of the system 100, as switching commands are more quickly received and responded to. In one embodiment, three AIP switches 308 are provided: an "ahead" switch, an "in" switch and a "past" switch. Selection of the "ahead" switch commands the audio module microcontroller 320 to present the audio source 112 coupled to the audio module 106 before an event from the event generator 102 occurs, while selection of the "in" and "after" switch commands the audio module microcontroller to present the audio source 112 coupled to the audio module 106 during and after the event, respectively.

Audio source faders 310 are also coupled to the audio microcontroller 320 via A/D converters 324. The A/D converters 324 digitize the voltage presented on the potentiometers used in these faders 310, thus translating audio module gain commands into digital user audio module gain commands. The A/D converters 324 then provide this digital signal to the audio microcontroller 320 to provide the fader setting information. The audio microcontroller 320 uses the fader setting information to determine the setting for the audio module amplifier 330 via the MDAC (multiplying digital to analog converter) controllers 326.

Hence, each of the audio module microcontrollers 320 generates digital audio module MDAC controller gain commands and digital audio module MDAC routing or switching commands from (1) the control module commands from the control module microcontroller 302 (2) the user event controls 308A, (3) the digital user audio module gain commands from the A/D converter 324, (5) events from the event generator 102 and (6) programming from the bus and table 322. For example, the table 322 may implement a logarithmic function used to map digital commands to amplifier 330 potentiometer settings.

When assembling a sound track, audio quality is of utmost importance. For that reason, the SMD 100 uses interconnected microcontrollers to control the action of analog components in the signal path, but the signal itself is not digitized or manipulated in digital form. The reprogrammable microcontroller digital control provides the flexibility to reconfigure the SMD 100 in a multitude of ways, while the analog signal path provides signal integrity and prevents quantization, aliasing, time shifting and phasing distortions in the signal itself. In this sense, the SMD 100 is essentially a hybrid device having an analog signal path, with analog components being digitally controlled by the microcontrollers to permit flexibility. To implement this, each of the audio modules 106 comprise one or more audio module MDAC controller 326 (one for each channel provided by the audio module), coupled to the audio module microcontroller 320. Each of the MDAC controllers 326 accepts the digital audio module MDAC controller gain commands and digital audio module MDAC routing or switching commands from the associated audio module microcontroller 320, and translates these commands into analog audio module switching commands and analog audio module gain commands. The analog module gain commands are provided to an audio module amplifier 330 to command an amplifier gain or attenuation, while the switching or routing commands are provided to an audio module switch 328, which selectably couples the audio source 112 with the amplifier 330 input.

As described above, there are a plurality of audio modules 106, and these plurality of audio modules 106 may include a DIRECT, MONITOR, DIALOG, MUSIC, AND EFFECT module, as well as three RETURN modules, and a BEEP module. One or more of these modules may comprise a plurality of channels and hence, a plurality of MDACs 326, switches 328, amplifiers 330, one for each channel. For example, the music audio module 106 may comprise 6 independent channels for 5.1 channel surround sound. The microcontroller 320 handles each channel independently, appropriately switching the appropriate channels of the audio sources to be amplified by amplifiers 332 and provided as outputs.

As described above, output(s) of selected audio module(s) 106 may be provided as an audio source to another audio module 106, optionally after processing by an external processor such as effects processor 107 shown in FIG. 1.

The communication module 108 comprises a communication module microcontroller 360 that is communicatively coupled to the control module microcontroller 302 to receive control module 103 commands and to the event generator 102 to receive events. It is also communicatively coupled to the communication control(s) 312, and generates digital communication routing commands from the user communication commands from the communication controls 312, the control module commands, events from the event generator 102, and the programmable routing table 362. Data source switches 364 reside at user stations (e.g. producer, control room, stage, editor, client) and typically provide an audio source 112 such as a talkback microphone and are co-located with output devices to reproduce output 380. The digital communication routing commands are provided to a plurality of switches 368, each coupled to at least one of the audio sources 112. The state of the switches 368 determines whether the signal from the audio source 112 is provided to the communications module amplifier 370 input. The output 372 of the communications module amplifier 370 can be provided to an alternate output 380 such as a remotely disposed station. This allows communication or transmission of the audio source (which may include one or more of the plurality of outputs 144 discussed below with a remotely disposed director or supervisor).

The SMD 100 also comprises a master module 110. The master module 110 may comprise an A/D converter 344 for translating user master module gain commands into digital user master module gain commands. The master module 110 may also comprise a master module microcontroller 340 communicatively coupled to the user event controls 308 to receive user commands relative to the events, to the A/D converter 344 to receive the digital user master module gain commands, and to the control microcontroller to accept the control module commands and programming. The master module microcontroller 340 generates digital master module MDAC controller gain commands and master module MDAC routing or switching commands for each output path 114 {including Foldback1 (left and right), Foldback2 (left and right), Editor (left and right), Actor (left and right), Stage (left, center, right), Control room (left, center, right, left surround, right surround and low frequency), and Effects}, from the control module commands, events from the event generator 102, the user event controls 308, the digital user master module gain commands from the A/D 344, and the programming according to a programmable master module log table 342.

The master module MDAC controller 346 is communicatively coupled to the master module microcontroller 340, accepts the digital master module MDAC controller gain commands from the master module microcontroller 340, accepts the master module routing or switching commands from the master module microcontroller 340 translates the digital master module MDAC routing or switching commands into analog master module switching commands, and translates the digital master module MDAC controller gain commands into analog master module gain commands for each of a plurality of master module amplifiers 350. The master module comprises at least one master module amplifier 350 and associated switch 348 for each channel of output from the master module 114 (including, for example (Foldback1(L/R), Foldback2(L/R), Editor(L/R), Actor(L/R), Stage(L/C/R), Control Room(L/C/R/LS/RS/Lfe). Each master module audio amplifier 350 has a gain control input for receiving the analog master module gain commands, a master module analog amplifier signal input and a master module analog output, which is coupled to one of the audio output 114.

Finally, each channel of the master module 110 comprises a summer 352 having a plurality of summer inputs, each communicatively coupled to one of the audio module amplifier outputs 332 associated with the channel. The summer 352 generates a sum of the signals coming from the associated audio module 106, and since whether there is a signal appearing at the output of each module's amplifier is controlled by the switching or routing commands provided by the MDAC from control module commands and events as interpreted by each module's microprocessor, it is possible for the output of each master module amplifier 350 to be a selectable and controllable combination of any proportion of any of the audio sources 112, and via return paths, a processed and gain controlled version of the output of any of the audio modules 106.

Figure 4:
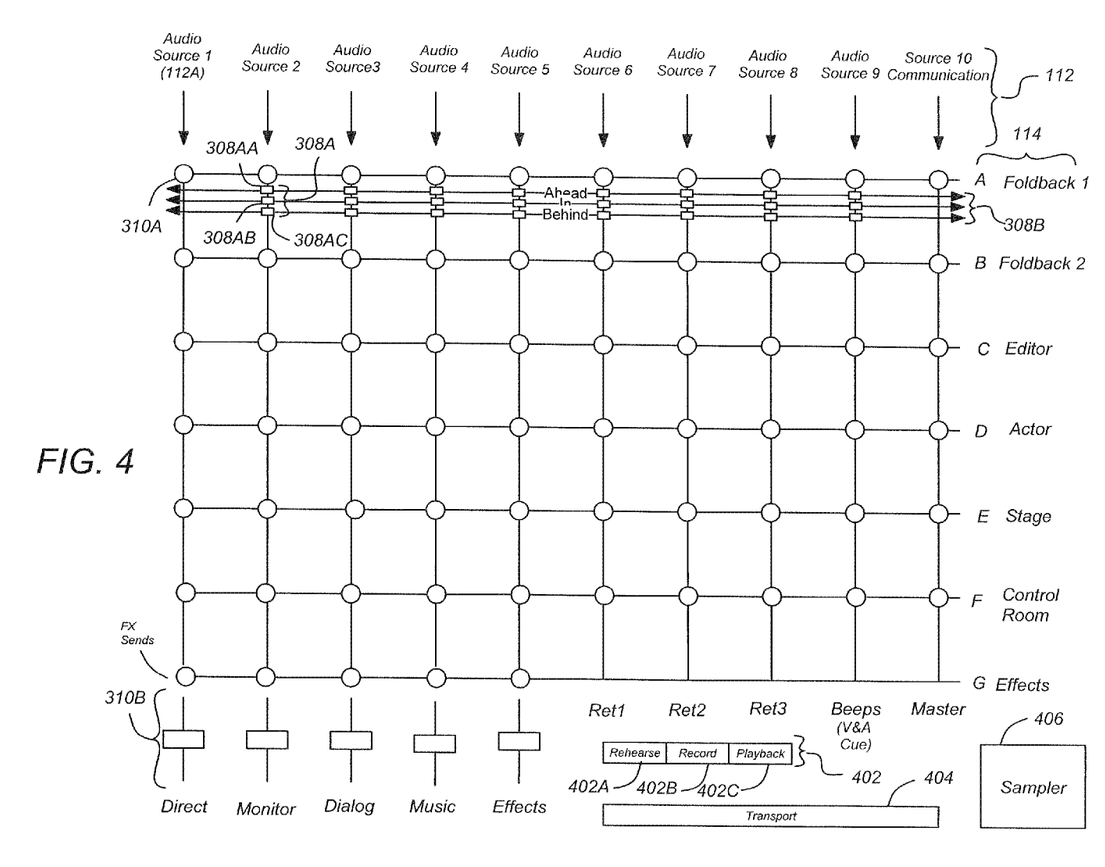
FIG. 4 is a more detailed view of the controls provided by the SMD.

FIG. 4 is a more detailed view of the controls provided by the SMD 100. Each of the user audio source faders 310 controls the amount of a particular audio source that is provided to the associated output channel 114. For example, fader 310A controls the amount of the output on the direct audio source 112A (which may be repurposed by the user) that is provided to foldback output 114. Further, audio source faders 310B controls the gain of audio source 112A across all outputs (A-F). Accordingly, the relative gain of the output from each of the audio sources 1-9 across all outputs (A-F) can be controlled, as well as the contribution from each audio source 1-9 to each output channel A-F.

The use of audio source faders 310B to control the overall gain of the DIRECT, MONITOR, DIALOG, MUSIC AND EFFECT modules provides the ability for a third party to exercise creative control over the mix of the soundtrack without requiring that the third party be trained in operation of the SMD 100. For example, while the ADR mixer may be familiar with the operation of the detailed audio and mixing controls shown, but the producer of the movie associated with the sound track may not. The use of audio source faders 310B operating on the audio signals fed into these modules as described above allow the producer to exercise creative control over the relative volumes of the dialog, music and effects in real time, whether while sitting at the SMD 100 with the ADR mixer or at a remote location like a theater as described further below. For example, the producer may be listening to the output of the MONITOR audio module, and determine that the sound effects associated with a depicted automobile crash are not loud enough. The director can ameliorate this problem by simply manipulating the related audio source fader 310B. The director could also increase the gain in the dialog channel, should they believe that dialog must be heard over the effects. Importantly, these adjustments may be made independently of the other potentiometers or faders 310A, which may remain in the control of the ADR mixer.

Further, any of audio sources 1-9 may be returned (i.e. after optional processing such as digital sampling and manipulation) through audio sources 6-8 (Ret1-3) and thereby provided to outputs A-F with variable gain as well. Using these settings (as programmed into the microprocessors and their associated tables, any output from any of the audio sources 112 can be provided in any combination to the editor, actor, stage, or control room. Further, by using the events triggering microprocessor commands to the switches acting as inputs to the module amplifiers 332, information can be provided to the appropriate output (e.g. the actor's headphones via output D) before the event (so the actor hears what is on audio source 2 before the event where the new information is to be inserted) by user selection of the "ahead" switch 308AA, what is on audio source 2 during the event by user selection of the "in" switch 308AB, and/or what is on audio source 2 after the event by user selection of the "past" switch 308AC. As is shown in FIG. 2, but not reproduced in FIG. 4, each of the audio module(s) 106 include an ahead, in and past switch.

FIG. 4 also shows that the user switch control settings may be tied to particular modes, which may include a rehearsal mode, a record mode, and a playback mode. In other words, the setting of switches 308 (only those associated with Foldback1 A output are illustrated, but as shown in FIG. 2, these switches are repeated for the other outputs B-F) may have an on or off state for each of the multiple modes, and selecting mode buttons 402 may control which user switches are activated. For example, the user may select "ahead," "in," and "past," for playback, but only "ahead" and "in" via switches 308AA-308AC for rehearsal. Selecting the playback button 402C before setting switches 308AA-308AC will allow the microprocessors to store those settings for the playback mode, while selecting the rehearsal button 402A before setting switches 308AA-308AC will allow the microprocessors to store those settings for the rehearsal mode. The user can then go to each mode's switch settings for all of the switches 308 by simply pressing the rehearse or playback buttons 402A and 402C. Transport controls 404, which may be managed by the event generator 102, move the soundtrack as recorded forward or back in time, so that already recorded selections can be played back. Sampler 406 can sample any of the audio sources 1-9 or outputs and provide the sampled audio output for digital processing. That digitally processed output can be provided as one of the audio sources (for example, return paths 1-3) to Effects output G, Foldback1 Output A, or Foldback2 Output B. This feature can be used to recreate the add ambience to one of the outputs (for instance, actors output D) so that the actor hears ambience similar to that of the already recorded soundtrack before, during or after the actor provides the new dialog. Digital sampling and re-insertion of the digitally sampled signals can be used in other contexts as well.

Communications controls 312 may include a switch for forwarding one or more of the audio sources 112 to an alternate output destination 380 such as a client (e.g. remote client), and/or the feedback 1 or feedback 2 paths, one or more of selected actors, or the entire stage.

Figure 5:
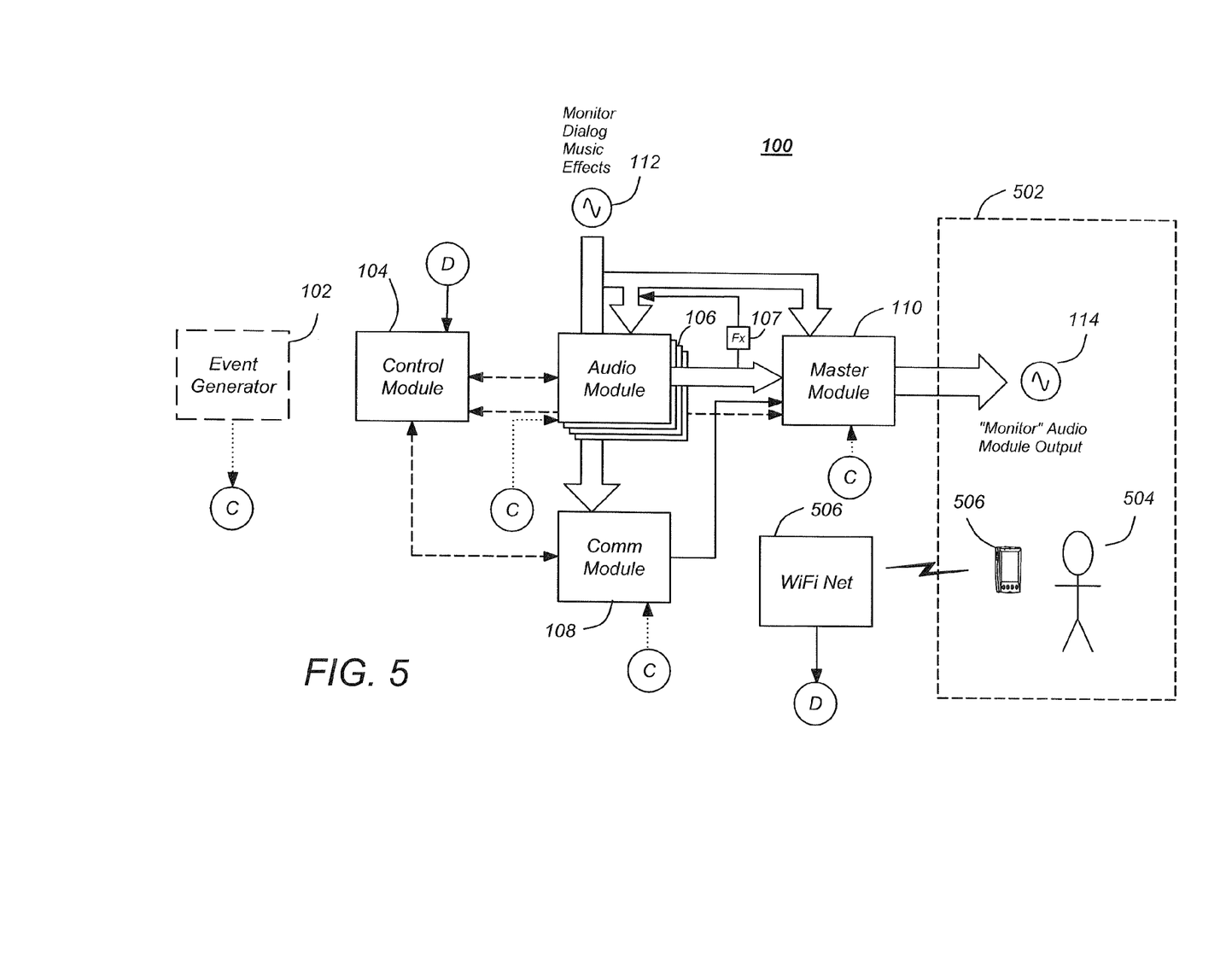
FIG. 5 is a diagram of one embodiment of the SMD as configured for remote control post production.

FIG. 5 presents an embodiment in which the SMD 100 is configured to allow remotely controlled post production mixing of the soundtrack in theater environments. This allows the user 504 (who may be a producer with little soundtrack production experience) to station themselves in a movie theater 502 or other environment that mimics the acoustics and sound system of a typical or exemplary customer premises such as a home or movie theater, and remotely adjust soundtrack parameters while listening to the soundtrack in that environment using a tablet computer, smartphone or similar remote device 506. In this embodiment, the remote device 506 is programmed to present some or all of the controls depicted in FIG. 2 to the user 504 and allow the user 504 to control the post production sound mix using the capability of the remote device 506 to display information and accept user input. For example, if the audio sources include the monitor, dialog, music, and effects on the soundtrack as described above, the monitor output can be provided to Stage E output, amplified and presented in the theater on a multi-channel surround sound system. The extent to which that monitor output comprises the dialog, music, and effects channels (e.g. the relative gain of each audio source) can be remotely controlled by the user 504 using the remote device 506 by programming the SMD 100 to transmit the setting of the sliders 310B, to accept changes in those settings, and to transmit the changed settings back to the SMD 100. The SMD may then make the changes to the mix (altering the comparative gain of the dialog, music and effects content) using microcontroller 302) and provide the soundtrack with the changes to the user 504 in the theater 502. This may also be implemented by wired connection as well.

In one embodiment, the user interface 200 of the SMD 100 is modularly constructed of the same form factor (physical dimensions and interfaces) as standard ADR mixing components and using an I2C bus (e.g. the busses illustrated in FIG. 3) for communications between elements. This permits the modular incorporation of the elements described above into a standard sound mixing system. Further, since the foregoing permits the mixing of a plurality of channels together to form other channels, the SMD could be used to mix signals in for non-ADR purposes, such as would be useful in small scale sound studios.

Hardware Processor Environment

Figure 6:
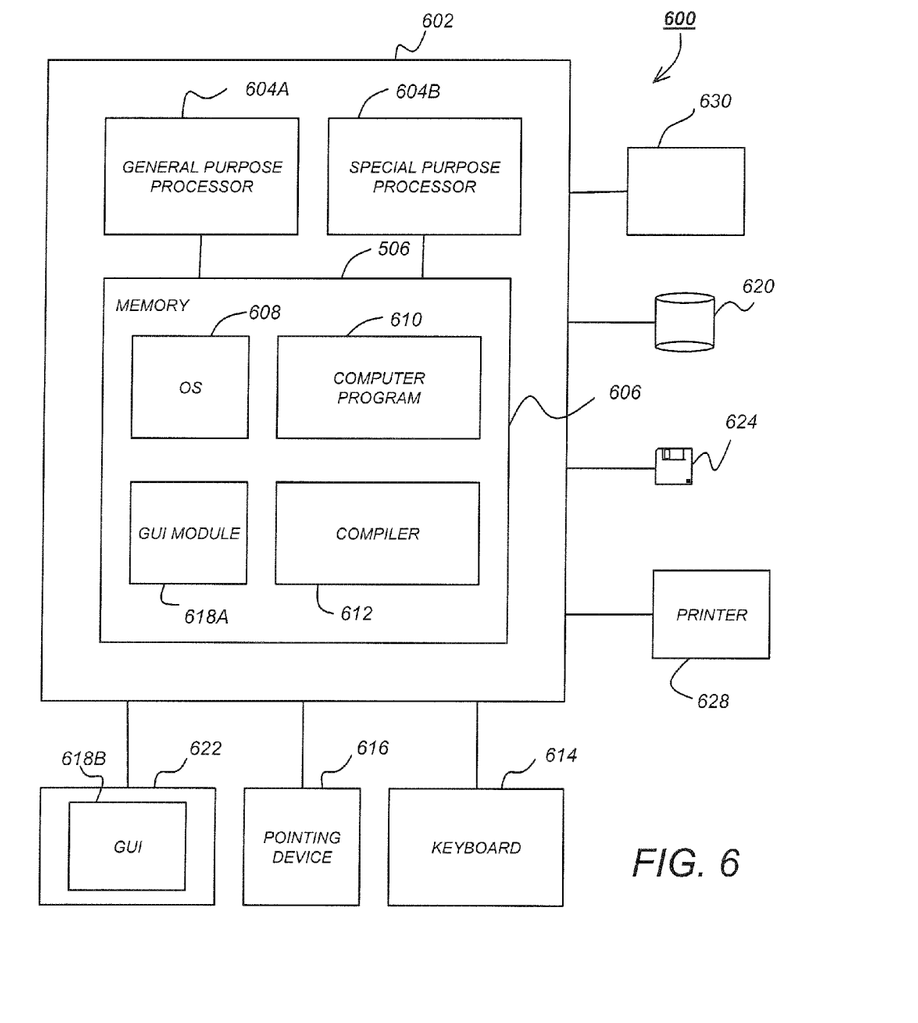
FIG. 6 is a diagram illustrating an exemplary processing system.

FIG. 6 is a diagram illustrating an exemplary processing system 600, elements of which could be used to implement elements of the present invention, including the event generator and microcontrollers 302, 320, 340 and 360 and remote device 606. A computer 602 comprises a general purpose hardware processor 604A and/or a special purpose hardware processor 604B (hereinafter alternatively collectively referred to as processor 604) and a memory 606, such as random access memory (RAM). The computer 602 may be coupled to other devices, including input/output (I/O) devices such as a keyboard 614, a mouse device 616 and a printer 628.

In one embodiment, the computer 602 operates by the general purpose processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608 to provide output and results.

Output/results may be presented on the display 622 or provided to another device for presentation or further processing or action. In one embodiment, the display 622 comprises a liquid crystal display (LCD) having a plurality of separately addressable pixels formed by liquid crystals. Each pixel of the display 622 changes to an opaque or translucent state to form a part of the image on the display in response to the data or information generated by the processor 604 from the application of the instructions of the computer program 610 and/or operating system 608 to the input and commands. Other display 622 types also include picture elements that change state in order to create the image presented on the display 622. The image may be provided through a graphical user interface (GUI) module 618A. Although the GUI module 618A is depicted as a separate module, the instructions performing the GUI functions can be resident or distributed in the operating system 608, the computer program 610, or implemented with special purpose memory and processors.

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 602 may also implement a compiler 612 which allows an application program 610 written in a programming language such as COBOL, C++, FORTRAN, or other language to be translated into processor 604 readable code. After completion, the application or computer program 610 accesses and manipulates data accepted from I/O devices and stored in the memory 606 of the computer 602 using the relationships and logic that was generated using the compiler 612.

The computer 602 also optionally comprises an external communication device such as a modem, satellite link, Ethernet card, or other device for accepting input from and providing output to other computers.

In one embodiment, instructions implementing the operating system 608, the computer program 610, and/or the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, or a flash drive. Further, the operating system 608 and the computer program 610 are comprised of computer program instructions which, when accessed, read and executed by the computer 602, causes the computer 602 to perform the steps necessary to implement and/or use the present invention or to load the program of instructions into a memory, thus creating a special purpose data structure causing the computer to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 602.

Although the term "computer" is referred to herein, it is understood that the computer may include any device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An event-driven sound mixing apparatus programmably interconnecting a plurality of audio sources to a plurality of audio outputs according to one or more events, comprising:
   a control module, for accepting a user input comprising an event control, a signal routing command, and a signal level command and for generating a control module command according to the event control and the signal routing command;
   a plurality of audio modules, each of the plurality of audio modules communicatively coupled to an associated one or more of the plurality of audio sources, to the control module, and to an event generator providing the one or more events, each of the plurality of audio modules comprising:
      at least one audio module amplifier, non-digitally coupled to the associated one or more of the plurality of audio sources and digitally controlled to provide an analog output according to the event control, the signal routing command, the signal level command, and the one or more events; and
   master module, for combining each of the analog outputs according to the event control, the signal routing commands, and the one or more events, the master module communicatively coupled to the control module and to the event generator providing the one or more events, comprising:
      at least one master module amplifier, non-digitally coupled to the analog outputs and digitally controlled to provide the second plurality of audio outputs according to the event control, the signal routing commands, the signal level commands, and the one or more events;
   wherein the one or more of the events comprises a dialog event, and at least one of the plurality of audio modules is configured to selectably present a signal having ambience simulating recorded ambience on a soundtrack to an associated analog output temporally ahead of the dialog event.

2. The apparatus of claim 1, wherein the event control and signal routing command control input to the at least one audio module amplifier.

3. The apparatus of claim 1, wherein the signal level commands control gain of each of the at least one audio module amplifier.

4. The apparatus of claim 1, wherein the signal level command is an analog signal level command and wherein the at least one audio module amplifier comprises:
   an A/D converter, for translating the analog signal level command into a digital audio module gain command;
   an audio module microcontroller, communicatively coupled to the event control, to the A/D converter to receive the digital audio module gain command, to a control microprocessor to accept the control module command, to the event generator to accept the one or more events, and to each of the at least one audio module amplifier, the audio module microcontroller for generating a digital audio module controller gain command from the digital audio module gain command and for generating a digital audio module routing command from the control module command and the one or more events;

an audio amplifier controller, communicatively coupled to the audio module microcontroller, for accepting the digital audio module gain command from the audio module microcontroller and generating an analog audio module gain command therefrom, for accepting the digital audio module routing command from audio module microcontroller and generating an analog audio module switching command therefrom;

wherein the at least one audio module amplifier comprises a gain control input for receiving the analog audio module gain command, an audio module amplifier signal input, and an audio module amplifier output; and at least one audio module switch for each of the plurality of audio sources, each audio module switch for selectably coupling the audio module amplifier signal input to at least one of the audio sources according to the analog audio module switching command.

5. The apparatus of claim 4, wherein the audio module microcontroller generates a digital audio module controller gain command from the analog audio module gain command and generates a digital audio module routing command from the control module commands and the event according to a programmable audio module log table.

6. The apparatus of claim 5, wherein each of the plurality of audio modules comprises a dedicated audio module amplifier for each channel of the audio source associated with the audio module.

7. The apparatus of claim 1, wherein the plurality of audio modules comprises:
 a direct audio module, for receiving a microphone input;
 a monitor audio module, for receiving a recorded soundtrack having dialog, music and effect content;
 a dialog audio module, for receiving the dialog content of the soundtrack;
 a music audio module for receiving the music content of the soundtrack; and
 an effects audio module for receiving the effect content of the soundtrack.

8. The apparatus of claim 1, wherein the event control and signal routing command controls input to each of the master module amplifiers.

9. The apparatus of claim 1, wherein the signal level command controls a gain of the at least one master module amplifier.

10. The apparatus of claim 1, wherein the signal level commands are analog and the master module comprises:
 an A/D converter, for translating the analog signal level command into a digital master module gain command;
 a master module microcontroller, communicatively coupled to the event control, to the A/D converter to receive the digital master module gain command, to a control microprocessor to accept the control module command, to the event generator to accept the event, and the master module amplifier, the master module microcontroller for generating a digital master module controller gain command from the digital master module gain command and for generating a digital master module routing command from the control module command and the event;
 a master amplifier controller, communicatively coupled to the master module microcontroller, for accepting the digital master module gain command from the master module microcontroller and generating an analog master module gain command therefrom, for accepting the digital master module routing command from master module microcontroller and generating an analog master module switching command therefrom;
 wherein the at least one master module amplifier comprises a gain control input for receiving the analog master module gain command, a master module amplifier signal input and a master module amplifier output; and
 at least one master module switch for each of the at least one master module amplifier, each master module switch for selectably coupling the master module amplifier input signal to at least one of the plurality of audio sources according to the analog master module switching command.

11. The apparatus of claim 10, wherein the master module microcontroller generates the digital master module controller gain command from the analog master module gain command and generates the digital module routing command from the control module command and the event according to a programmable master module log table.

12. The apparatus of claim 1, wherein at least one of the plurality of audio modules comprises a plurality of audio amplifiers, each one of the plurality of audio amplifiers being dedicated to one channel of the audio source communicatively coupled to the at least one of the plurality of audio modules.

13. The apparatus of claim 12, wherein the master module comprises a summer for each channel of the audio source.

14. The apparatus of claim 1, further comprising:
 a communication module, communicatively coupled to one or more of the plurality of audio sources, to the control module, to the master module, and to the event generator, the communications module for accepting a control module command and the event and generating a digital routing command and a communications module audio output therefrom.

15. The apparatus of claim 14, wherein the master module comprises a second summer having a first input communicatively coupled to a master module amplifier output and a second input communicatively coupled to the communications module audio output.

16. The apparatus of claim 1, further comprising a remote device, wirelessly communicatively coupled to the control module, the remote device for providing a user interface for entering user commands, for accepting the provided the user commands via the user interface, and for providing the accepted user commands to the control module as the user input.

17. The apparatus of claim 1, further comprising a remote device, wirelessly communicatively coupled to the control module, the remote device for receiving control sound mixing apparatus control settings from the control module, for accepting user updates to the control sound mixing apparatus control settings, and for transmitting the accepted updates to the sound mixing apparatus control settings to the control module.

18. A method for programmably interconnecting a plurality of audio sources to a plurality of audio outputs according to one or more events, comprising:

accepting user input comprising an event control, a signal routing command, and a signal level command;
generating a control command according to the event control and the signal routing command;
digitally controlling at least one of a plurality of audio module amplifiers to provide an analog output according to the event control, the signal routing command, the signal level command, and the one or more events, the at least one of the plurality of audio module amplifiers being of one of a plurality of audio modules communicatively coupled to an associated one or more of the plurality of audio sources and non-digitally coupled to at the associated one or more of the plurality of audio sources; and
digitally controlling at least one master module amplifier to combine each of the analog outputs according to the event control, the signal routing command, and the event, the at least one master module amplifier being of a master module and non digitally coupled to the analog outputs;
wherein the at least one or more of the events is dialog event, and the at least one of the plurality of audio modules is configured to selectably present a signal having ambience simulating recorded ambience on a soundtrack to an associated analog output temporally ahead of the dialog event.

19. The method of claim 18, wherein the event control and signal routing command control input to each of the at least one of the plurality of audio module amplifiers.

20. The method of claim 18, wherein the signal level command controls a gain of each of the at least one of the plurality of audio module amplifiers.

21. The method of claim 18, wherein the signal level command is an analog signal level command and wherein the analog output is provided according to the event control, the signal routing command, the analog signal level command, and the event by:
translating the analog signal level command into a digital audio module gain command;
generating a digital audio module controller command from the digital audio module gain command;
generating digital audio module routing command from the control command and the event;
generating an analog audio module gain command from digital audio module gain command;
generating an analog audio module switching command from the digital audio module routing command; and
selectably coupling an analog input signal of the at least one of the plurality of audio module amplifiers to at least one of the audio sources according to the analog audio module switching command.

22. The method of claim 21, wherein the digital audio module controller command is generated from the digital audio module gain command, and the digital audio module routing command is generated from the control module command and the event according to a programmable audio module log table.

23. The method of claim 22, wherein the at least one of the plurality of audio modules comprises a dedicated audio module amplifier for each channel of the audio source associated with the audio module.

24. The method of claim 18, wherein the one or more of the plurality of audio sources comprises:
a microphone input;
a recorded soundtrack having dialog, music and effect content;
dialog content of the soundtrack;
music content of the soundtrack; and
effect content of the soundtrack.

25. The method of claim 18, further comprising:
controlling input to the at least one master module amplifier according to the event control and the signal routing command.

26. The method of claim 18, wherein the signal level command controls a gain of the at least one master module amplifier.

27. The method of claim 18, wherein the signal level command is analog and wherein each of the analog outputs are combined by the master module amplifier by:
translating the analog signal level command into a digital master module gain command;
generating a digital master module controller gain command from the digital master module gain command;
generating a digital master module routing command from the control command and the event;
generating an analog master module gain command from the master module controller gain command;
generating an analog master module switching command from the digital master module routing command; and
selectably coupling an analog input signal of the master module amplifier to at least one of the plurality of audio sources according to the analog master module switching command.

28. The method of claim 27, wherein the digital master module controller gain command is generated from the analog master module gain command and the digital module routing command is generated from the control module command and the event according to a programmable master module log table.

29. The method of claim 18, wherein the at least one of the plurality of audio modules comprises a plurality of audio amplifiers, each one of the plurality of audio amplifiers being dedicated to one channel of the audio source communicatively coupled to the at least one of the plurality of audio modules.

30. The method of claim 29, wherein the master module comprises a summer for each channel of the audio source.

31. The method of claim 18, further comprising:
generating a digital routing command and a communications module audio output from the control command and the event.

32. The method of claim 18, further comprising:
receiving control sound mixing apparatus control settings from a control module in a remote device wirelessly communicatively coupled to the control module;
accepting user updates to the control sound mixing apparatus control settings; and
transmitting the accepted updates to the sound mixing apparatus control settings to the control module.

33. The apparatus of claim 1, wherein:
the apparatus further comprises a return module for returning at least one of the analog outputs as one of the plurality of audio sources;
at least one of the analog outputs comprises a signal having the recorded ambience on the soundtrack; and
another of the analog outputs is provided to the return module via an effects processor generating the ambience simulating the recorded ambience.

34. The method of claim 18, wherein:
at least one of the plurality of audio outputs comprises a signal having recorded ambience; and the method further comprises providing another of the analog outputs to a return module via an effects processor generating ambience simulating the recorded ambience.

35. The apparatus of claim 33, further comprising:
a switch, communicatively coupled to the at least one of the plurality of audio modules, the switch for selectably configuring the at least one of the plurality of audio modules to present the signal having the ambience simulating the recorded ambience to the associated analog output temporally ahead of the dialog event.

* * * * *